United States Patent
Holdaway et al.

(10) Patent No.: US 7,102,664 B2
(45) Date of Patent: Sep. 5, 2006

(54) CAMERA SYSTEM

(75) Inventors: Richard Holdaway, Highworth (GB); Nicholas Richard Waltham, Harwell (GB); Peter Frank Gray, Wantage (GB)

(73) Assignee: The Council for the Central Laboratory of the Research Councils, Didcot (GB)

( * ) Notice: Subject to any disclaimer, the term of this patent is extended or adjusted under 35 U.S.C. 154(b) by 801 days.

(21) Appl. No.: 10/351,174

(22) Filed: Jan. 23, 2003

(65) Prior Publication Data

US 2003/0117493 A1    Jun. 26, 2003

Related U.S. Application Data

(63) Continuation of application No. 08/957,168, filed on Oct. 24, 1997.

(30) Foreign Application Priority Data

Oct. 25, 1996  (GB) .................................. 9622253.4

(51) Int. Cl.
  *H04N 7/18*  (2006.01)
  *G02B 17/00*  (2006.01)
(52) U.S. Cl. ........................................ 348/144; 359/727
(58) Field of Classification Search ................ 348/144, 348/143; 356/456, 497, 366, 367; 359/366, 359/365, 359, 727, 858
  See application file for complete search history.

(56) References Cited

U.S. PATENT DOCUMENTS

| 4,280,141 A | 7/1981 | McCann et al. |
| 4,689,758 A * | 8/1987 | Carreras ..................... 356/497 |
| 4,833,724 A | 5/1989 | Goel ............................ 382/65 |
| 5,125,743 A * | 6/1992 | Rust et al. ................... 356/367 |
| 5,155,597 A | 10/1992 | Lareau et al. .......... 358/213.24 |
| 5,379,065 A | 1/1995 | Cutts .......................... 348/259 |
| 5,414,555 A | 5/1995 | Chan et al. |
| 5,692,062 A | 11/1997 | Lareau et al. ................ 382/107 |
| 5,748,365 A | 5/1998 | Chen .......................... 359/366 |
| 5,768,040 A * | 6/1998 | Macenka et al. ............ 359/859 |
| 5,777,736 A | 7/1998 | Horton ........................ 356/346 |
| 5,790,188 A | 8/1998 | Sun ............................. 348/144 |
| 5,883,584 A | 3/1999 | Langemann et al. ........ 348/144 |
| 5,995,280 A * | 11/1999 | Beach ......................... 359/366 |
| 5,999,211 A | 12/1999 | Hedges et al. .............. 348/144 |

FOREIGN PATENT DOCUMENTS

| EP | 0 080 566 | 6/1983 |
| EP | 0 066 427 | 4/1985 |
| EP | 0 223 260 | 5/1987 |
| WO | WO 92/07504 | 5/1992 |
| WO | WO 93/25927 | 12/1993 |

OTHER PUBLICATIONS

Spiro, Irving J., Chair/Editor. *Infrared Technology XIV*, SPIE, vol. 972, 1988, p. 83-106.

Schlig, E.S. *A 3072×32- stage TDI imaging device*, IBM J. Res. Develop., vol. 35, No. 1 / 2, Jan./Mar. 1991, Armonk, NY.

* cited by examiner

*Primary Examiner*—Gims Philippe
(74) *Attorney, Agent, or Firm*—Drinker Biddle&Reath LLP

(57) ABSTRACT

The camera system consists of a folded optical system that focuses object in the visible waveband on a plurality of CCD detector arrays (6). The camera system is a push-broom imager with a plurality of long, substantially linear CCD arrays (6) arranged orthogonal to the scan direction S. The camera system is capable of image resolutions down to 1 m from a space orbit.

14 Claims, 3 Drawing Sheets

CAMERA SYSTEM

This application is a continuation of application Ser. No. 08/957,168, filed Oct. 24, 1997, which is incorporated herein by reference in its entirety.

The present invention relates to a camera system and in particular to a camera system for ground surveillance and remote sensing from space.

Camera systems for space surveillance capable of imaging down to less than 10 metres ground sampling distance are well known. However, such systems are expensive and for those systems which provide even finer imaging, for example below 1 metre, the costs become very high, up to $2 billion.

An example of a known camera system which is capable of providing low resolution imagery is the BADR-B system which consists of lens optics for focusing the light image onto a square CCD array.

The present invention seeks to provide a camera system which is capable of imaging to below 1 metre ground sampling distance with a significant reduction in the overall costs of the camera system in comparison to known systems.

The present invention provides a camera system comprising a plurality of object detectors, each object detector comprising an array of charge coupled devices (CCDs), and optical means for focusing an object on the plurality of object detectors comprising a telescope arrangement of mirrors and wherein the number of CCD pixels of each CCD array in a plane orthogonal to the scan direction of the camera system is much greater than the number of CCD pixels in a plane parallel to the scan direction and the plurality of object detectors are substantially linearly aligned.

Each of the CCD arrays has at least two pixels in orthogonal dimensions. Preferably, the CCD pixels are addressed so that the outputs of the CCDs are subject to a time delay integration. Additionally, preferably, each of the object detectors is positioned in the focal plane of the camera system and partially overlap one another. Ideally, each of the arrays of CCD, pixels is divided into a plurality of separately addressable groups enabling parallel readout of data.

With the present invention a camera system is provided which is capable of below 4 metres ground sampling distance from space and in a preferred embodiment around 1 metre, in a modular design which ensures the system is more compact and lighter in weight than conventional systems. Since the camera system is intended for use in space orbit the size and weight of the camera system is an important factor as it determines the ease and expense of positioning the camera system in orbit. Moreover, with the present invention savings of approximately an order of magnitude can be made in the overall cost of the camera system in comparison with conventional systems.

An embodiment of the present invention will now be described by way of example with reference to the accompanying drawings, in which.

It is to be understood that reference herein to a linear array of CCD pixels is intended as reference to an array of CCD pixels having a much greater number of individual pixels in a plane orthogonal to the scan direction of the camera system in comparison to the number of pixels in a plane parallel to the scan direction. The ratio of the number of CCD pixels in a plane orthogonal to the scan direction to the number of CCD pixels in a plane parallel to the scan direction is greater than 2:1. Preferably, the minimum ratio is 10:1 and ideally the ratio is 64:1.

Figure 3:
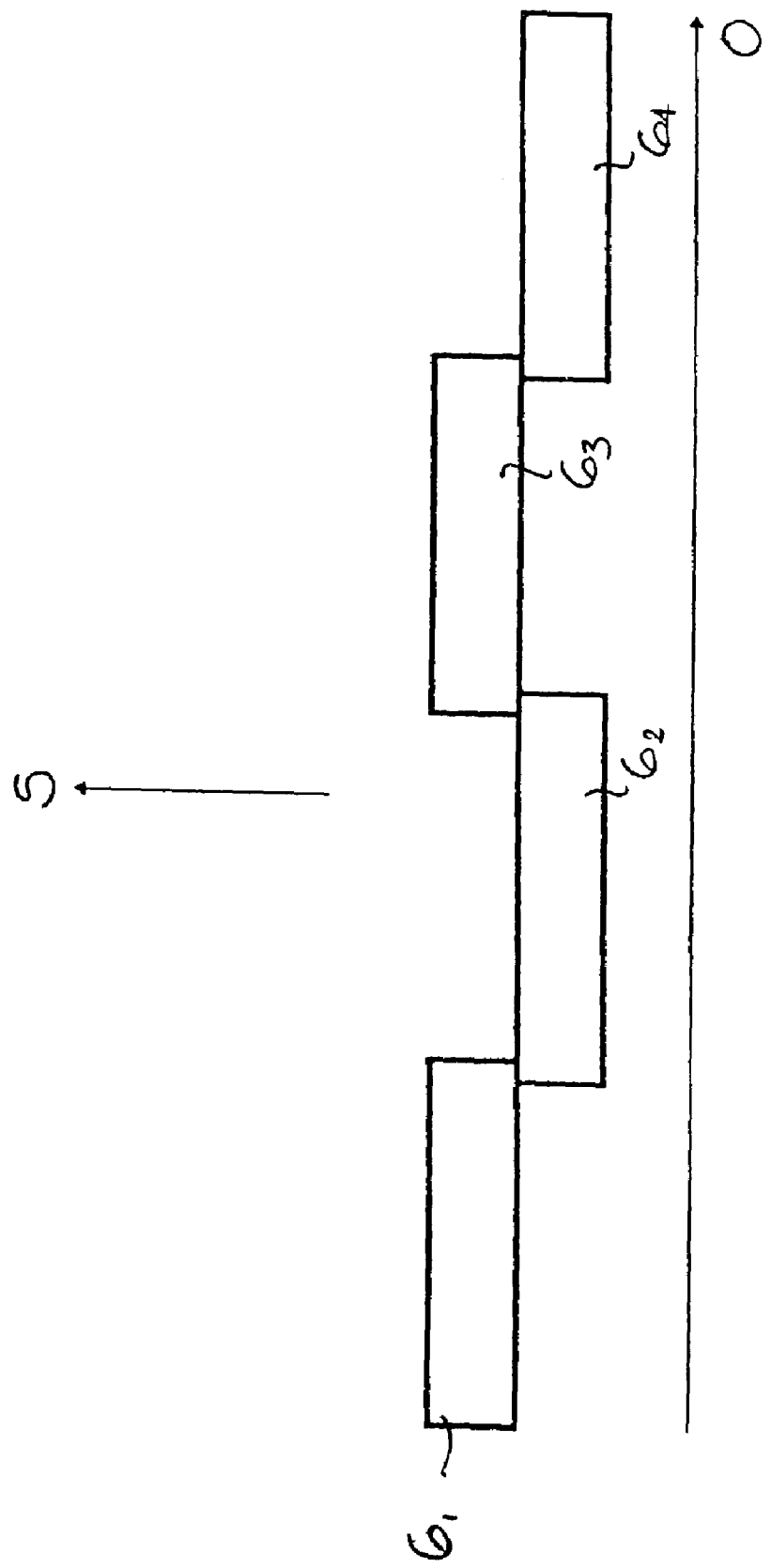
FIG. 3 is a diagram of the arrangement of CCD detectors in the camera system of the present invention.

The camera system, which provides ground surveillance and remote sensing from space, consists of a folded optical system (shown in FIG. 1) that focuses objects in the visible waveband on a plurality of CCD detector arrays (shown in FIG. 3). Infra-red sensing can also be provided, albeit at reduced resolution. By using a folded optical system the size of the camera system can be reduced overall. The camera system is a push-broom imager which is modular in design having a plurality of long, linear CCD arrays arranged orthogonal to the scan direction S (along-track scan). The camera system is designed for operation at any altitude. As an example, at an altitude of 600 km the equivalent ground speed is roughly 6.91 km/s. This implies that the camera will traverse 1 m on the ground in a time period of approximately 145 µs. For a resolution of 1 m ground sampling distance, this means that each detector must be capable of being read out within 145 µs. At higher altitudes greater focal lengths are required for the same ground sampling distance which in turn increases both the size and weight of the camera system.

Figure 1:
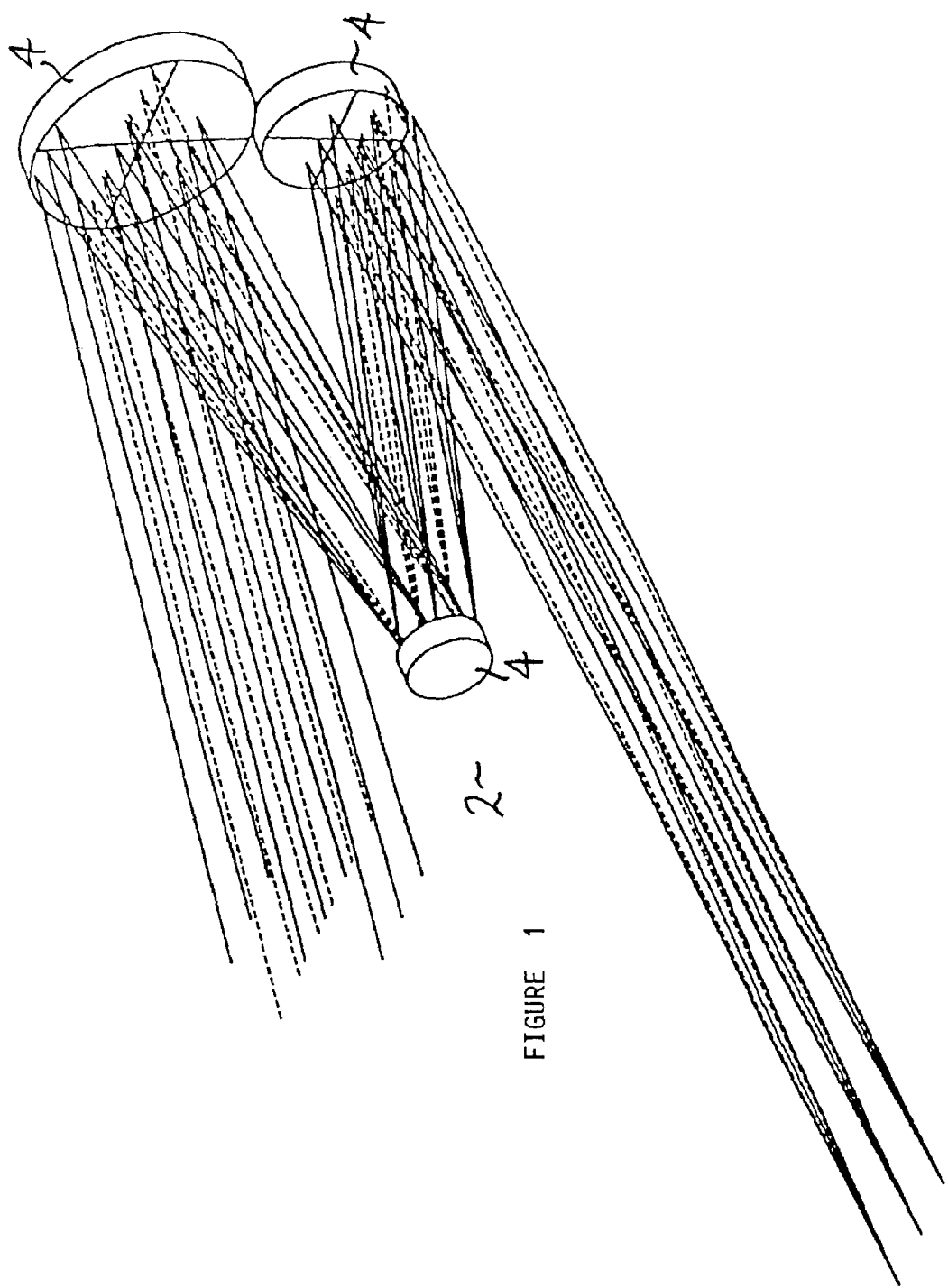
FIG. 1 is a diagram of a 3-mirror system forming the optical system of the present invention.

The optical system is based on an off-axis 3-mirror telescope design 2, as shown in FIG. 1, which is a well known optical arrangement of mirrors. The off-axis telescope design enables baffling against stray light which is particularly important where, as in the present case, the camera system is to be used for Earth imaging rather than astronomical sensing.

The 3-mirror system 2 has a decentered pupil so that there is no central obscuration in the beam. Otherwise such obstructions can significantly reduce image contrast. However, using a decentered pupil reduces the field of view in the plane of pupil decentration whilst the field of view in the orthogonal plane remains substantially unaffected. For this reason, conventionally, decentered pupil design has not been considered the preferred option. With the camera design described herein, though, as the camera detectors are arranged in a linear array, loss of the field of view in one plane does not affect the performance of the camera system as the plane of pupil decentration is aligned transversely to the array of detectors. The mirrors 4 are generally of aspheric form so as to achieve diffraction limited designs. The forms are kept to conic sections as much as possible to facilitate accurate testing of the individual mirrors during manufacture prior to system assembly.

Diffraction at the entrance pupil of the system places an ultimate limit upon the resolution achievable. However, unlike astronomical sensing where the image is interpreted as an assembly of point images, in ground sensing the image is extended which means to say that the image is a two-dimensional intensity distribution map in which the desired information is the spatial arrangement and contrast in the intensity distribution. (Information on the spectral content of the image may also be required). These imaging requirements in turn affect the definition of the desired optical resolution for example where structures in an extended object are small enough for their images to be degraded by diffraction even though the extended object as a whole is larger than the diffraction limit. Such structures will, to some extent, be reproduced in the image, but their contrast in the image will be less than for larger structures. To address this problem the resolution of the system is specified using the contrast transfer function or modulation transfer function (MTF) which specifies resolution in terms of the variation of contrast in the image as a function of image structure size in cycles per millimetre.

The camera system at an orbital altitude of 600 km requires an entrance pupil or aperture diameter of around 0.5 m if the Airy disc for visible light is to be approximately 1.5 m in diameter on the ground. This means that the MTF of the image produced by the camera system will decrease to zero for objects having a size of 1.5 m or less. The size of the smallest resolvable object varies in inverse proportion to the entrance aperture size and in direct proportion to the wavelength.

Figure 2:
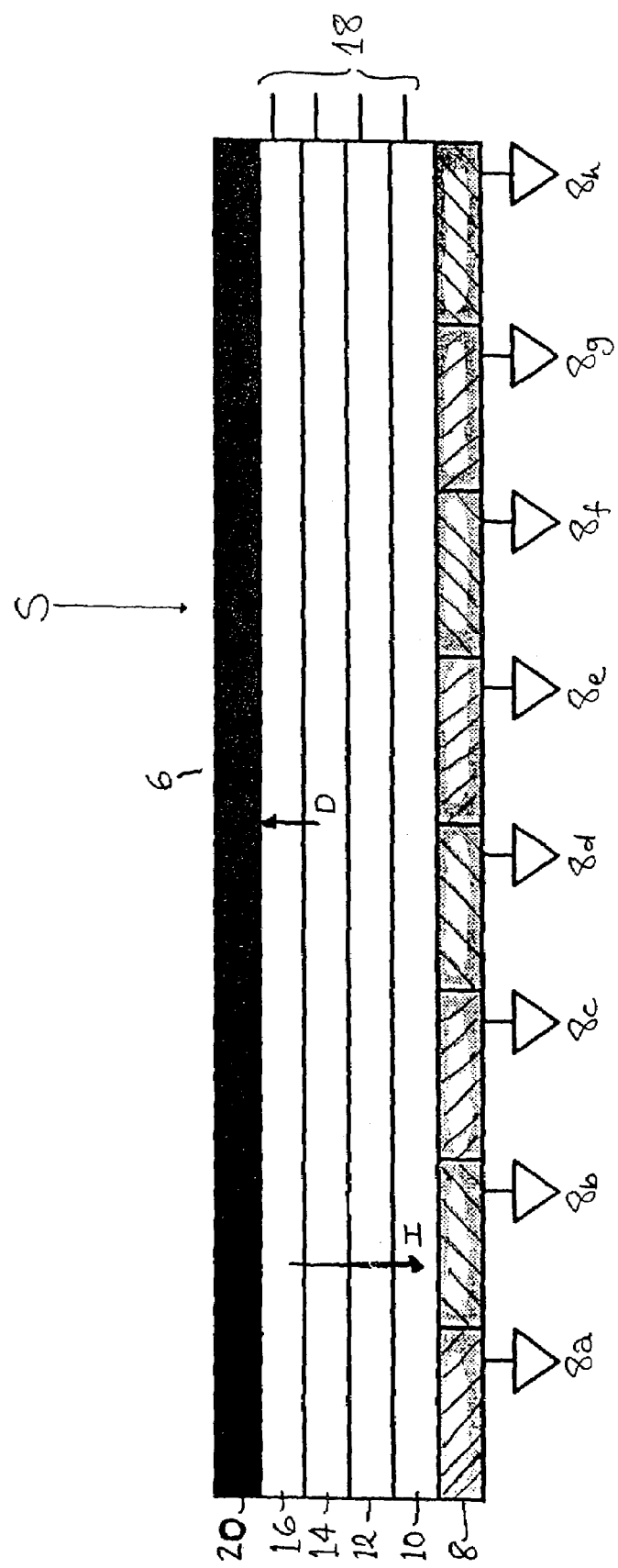
FIG. 2 is a diagram of a CCD detector of the camera system of the present invention.

For recording the images focused by the folded mirror optical system 2, the camera system has a plurality of detector arrays 6. Each detector array ($6_1$, $6_2$, $6_3$, $6_4$) consists of a linear charge coupled device (CCD) array, four are shown in FIG. 3. The detector arrays 6 are aligned substantially linearly along a plane O orthogonal to the scan direction S of the camera system. The plane O defines the swath of the camera system. As can be clearly seen each of the detector arrays partially overlaps with an adjacent array along at least one end. Thus, in the case of the array 6, furthest to the left (in FIG. 3), the right-hand end of the array 6 overlaps with the left-hand end of the adjacent array $6_2$, and so on. The CCD array preferably features 12 μm pixels arranged in a 8192×128 Time Delay Integration (TDI) array, as shown in FIG. 2. This affords a total focal plane coverage of 4×8000 pixels. The fact that the pixels are not infinitely small does though have the effect of degrading the MTF slightly.

The readout register 8 is provided along one of the long (longitudinal) edges of the array and is divided into preferably eight sub-registers each with its own parallel output port (8a–8h). This enables parallel readout which affords an eightfold (for example) increase in the effective frame readout rate. Where larger resolutions are acceptable, the sub-registers (8a–8h) can be grouped so that the array is read out through only four of the potential eight ports. Thus the camera system enables optimisation of the number of parallel video signal processing and digitisation channels needed which in turn enables optimisation of the pixel readout rate.

The long axis of the array, extending for 8192 pixels, is aligned with the swath O of the camera system so that there are 128 CCD lines aligned with the scan direction S. As the camera system orbits the Earth, the image projected on to the pixels moves across the 128 CCD lines towards the readout register 8 at a rate determined by the equivalent ground speed and the optical configuration. The TDI enables the image to be 'clocked' at the same rate as it moves across the array. This means that the image is integrated over itself 128 times as its crosses the array any optical image smear can be avoided. Thus, the 128 line TDI CCD array effectively provides 128 times greater sensitivity than a conventional (one line) CCD detector.

The 128 TDI CCD lines are preferably grouped for example into four banks 10, 12, 14, 16 each of 32 lines of pixels, as shown in FIG. 2. Thus, the first-bank 10 groups lines 1 to 32 of the pixel array, bank 12 group lines 33 to 64, bank 14 groups lines 65 to 96 and bank 16 groups lines 97 to 128. Each group is clocked 18 independently and enables the lines to be selectable. For example, some of the lines may be clocked backwards towards a 'dump' drain diode 20 (shown in FIG. 2 on the opposing longitudinal edge of the array opposite to the readout register 8) where necessary. In FIG. 2 arrow I represents the nominal direction of charge transfer during image integration whereas arrow D represents the direction of charge transfer during 'image dump'. The ability to select the number of lines which are used in a given integration provides a form of exposure control and enables limited adjustment for varying illumination conditions around the orbit.

The clocking, control and readout of the detectors is straightforward. Data compression and encryption can be performed for efficient and secure utilisation of the camera system.

Each CCD array 6 acts as a single detector channel. With the camera system described herein a plurality of detector channels are provided, preferably four, to provide increased swath coverage. As shown in FIG. 3, the four detector channels $6_1$, $6_2$, $6_3$, $6_4$ are arranged in the focal plane along the swath O (i.e. orthogonal to the scan direction) and the detector channels are staggered, as mentioned earlier, so as to provide a small overlap between each of the CCD arrays. This ensures that there are no gaps in the image subsequently obtained from the four detectors following TDI. For example the overlap may be approximately 192 pixels. The overall length of the detector is therefore around 38 cm.

As each pixel is 12 μm in size the overall linear array of the four detectors (around 32000 elements) requires an image field of 384 mm in one dimension. The field requirement in the other dimension is smaller. For an effective focal length of 7200 mm, this corresponds to a field angle of +/−1.52°.

The camera system shown in FIG. 3 gives a 32 km swath where the camera system is set up for 1 m pixel ground sampling distance. In circumstances where less ground resolution is required, for example 4 m, 10 m or more per pixel, the focal length of the instrument decreases which in turn reduces the size and weight of the camera system. Also, the detectors can be read more slowly because the time taken to traverse 4 m of ground is greater by a factor of 4.

Since the camera system is to be transported into space and is intended for orbiting around the Earth, the materials employed are particularly important. For example, Beryllium and silicon carbide afford weight reduction and increased stiffness in comparison to other materials commonly employed in this field.

With the camera system described, high resolution ground images can be achieved employing a more compact and lightweight system in comparison to conventional systems. Also, the camera system affords a degree of flexibility in both resolution and data rate depending upon any particular set of requirements. It will of course be realised that alternative numbers of detector channels and pixels in each array may be used without departing from the overall concept of the camera system involving a linear array of detectors and a folded 3-mirror imaging system.

The invention claimed is:

1. A camera system for scanning a remote object from space, comprising:
   a plurality of object detectors each comprising a pixellated array of charge coupled devices (CCDs) acting as a single detector channel; and
   a telescope arrangement of mirrors defining a folded optical path for focusing an object on the plurality of object detectors;
   wherein the number of CCD pixels of each object detector in a direction orthogonal to a scan direction of the camera system is greater than the number of CCD pixels in the scan direction; and
   wherein the plurality of object detectors are substantially in a line orthogonal to the scan direction.

2. A camera system as claimed in claim 1, wherein each object detector is positioned substantially in the focal plane of the camera system.

3. A camera system as claimed in claim 2, wherein at least one end of each object detector partially overlaps with an end of an adjacent object detector.

4. A camera system as claimed in claim 1, wherein at least one end of each object detector partially overlaps with an end of an adjacent object detector.

5. A camera system as claimed in claim 1, further comprising addressing circuitry for addressing the CCD pixels in each of the pixellated arrays and wherein the addressing circuitry is adapted to perform time delay integration of the outputs from the CCD pixels.

6. A camera system as claimed in claim 1, wherein each pixellated array of CCDs is divided into a plurality of separately addressable sectors and the addressing circuitry is separately connected to each addressable sector thereby enabling parallel readout of the outputs from each sector.

7. A camera system as claimed in claim 1, wherein the camera system is a push-broom imager.

8. A camera system as claimed in claim 1, wherein the telescope arrangement of mirrors is an off-axis telescope arrangement.

9. A camera system as claimed in claim 8, wherein the off-axis telescope arrangement of mirrors has a decentered pupil.

10. A camera system as claimed in claim 1, wherein the ratio of the number of CCD pixels in a plane orthogonal to the scan direction of the camera system to the number of CCD pixels in a plane parallel to the scan direction is at least 2:1.

11. A camera system as claimed in claim 10, wherein the ratio is at least 10:1.

12. A camera system as claimed in claim 11, wherein the ratio is around 64:1.

13. A camera system as claimed in claim 1, suitable for spaceborne observation providing a spatial ground resolution of at least 4 m.

14. A camera system as claimed in claim 13, suitable for spaceborne observation providing a spatial ground resolution of around 1 m.

* * * * *